Sept. 14, 1943. P. S. CARTER Re. 22,374

TRANSMISSION LINE MATCHING

Original Filed March 14, 1939

INVENTOR.
PHILIP S. CARTER

BY H. S. Grover
ATTORNEY.

Reissued Sept. 14, 1943

Re. 22,374

UNITED STATES PATENT OFFICE 22,374

TRANSMISSION LINE MATCHING

Philip S. Carter, Port Jefferson, N. Y., assignor to Radio Corporation of America, a corporation of Delaware Original No. 2,273,465, dated February 17, 1942, Serial No. 261,745, March 14, 1939. Application for reissue May 30, 1942, Serial No. 445,227

8 Claims. (Cl. 178—44)

The present invention relates to a means for matching a transmission line having a predetermined value of surge impedance with an antenna or a load circuit having a widely different value of impedance.

More particularly, the present invention relates to means for matching a transmission line to an antenna whereby the frequency band width of the antenna is not curtailed. Both experience and theory show that when an antenna having a broad frequency characteristic is matched to the transmission line by means of one of the usual type matching circuits, the frequency band width is considerably narrowed. The extent of the detrimental effect of such a circuit is directly proportioned to the ratio of the impedance change.

The present invention relates to methods of, and means for matching a transmission line to a load circuit by means of which the above mentioned difficulty is, for most practical purposes, eliminated.

An object of the present invention is to match the impedance of an antenna having a broad frequency characteristic to the surge impedance of a transmission line without destroying the frequency characteristic of the antenna.

Another object of the present invention is to provide matching means for the impedance of an antenna to the surge impedance of a transmission line having a value of surge impedance widely different from the impedance of the antenna without restricting the frequency band width of the antenna.

Still another object of the present invention is to provide means for matching the impedance of one radio frequency translating means to the impedance of another translating means having a value of impedance widely different from the impedance of the first translating means without restricting the frequency band width over which said means are operative.

Briefly, my invention involves the use of an even number of quarter wave line sections in series between the antenna or other load and the transmission line or other translating means, the ratio of impedance of said sections bearing such a relationship to the ratio of the impedances of the transmission line and antenna that the transmission line is matched to the load over a comparatively wide band of frequencies.

Figure 1:
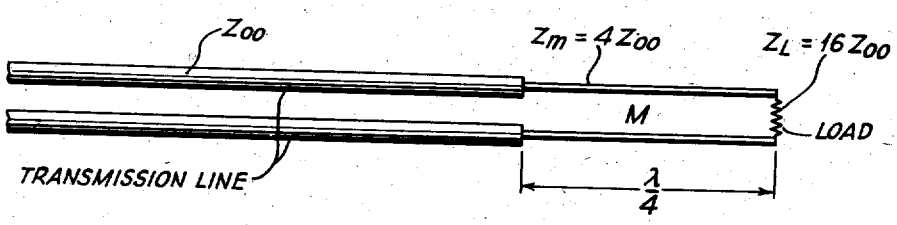
Figure 2:
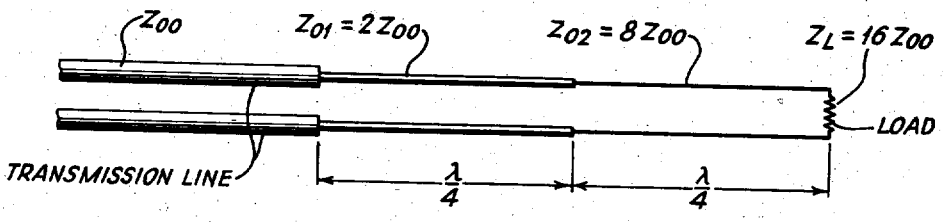

For a more complete understanding of the invention, reference may now be made to the following detailed description which is accompanied by drawing in which Figure 1 illustrates a method of matching a transmission line to a load circuit having a value of impedance different from the impedance of the transmission line and is shown only for the purposes of explanation; Figure 2 illustrates diagrammatically an example of the present invention wherein 2 quarter wave line sections connected in series are interposed between the transmission line and the load.

Figure 1 shows a transmission line having a surge impedance indicated by $Z_{00}$, connected to a load having an impedance $Z_L$ equal to sixteen times the impedance $Z_{00}$. Connected between the transmission line and load is shown a matching section M having a length equal to a quarter of the length of the operating wave and having a surge impedance $Z_M$ equal to four times the surge impedance $Z_{00}$ of the transmission line.

In Figure 2 the same transmission line and same load are shown as in Figure 1. Interposed between the transmission line and the load are two impedance matching sections $M_1$ and $M_2$ connected in series and each having a length equal to a quarter of the length of the operating wave at the midband frequency.

According to my invention the surge impedance $Z_{01}$ of the first matching section $M_1$ is made equal to the one-quarter power of the impedance ratio between the transmission line and the load or, in the specific example shown in Figure 2, twice the surge impedance of the transmission line. The surge impedance $Z_{02}$ of the second matching section $M_2$ is made equal to the three-quarter power of the impedance ratio between the transmission line and the load or, in the specific example shown in Figure 2, equal to eight times the impedance of the transmission line.

While I have shown the use of two matching sections in Figure 2 it is to be clearly understood that a number of matching sections may be any even number in accordance with the invention.

In the following detailed mathematical theory of broad band impedance matching according to my invention, $n$ sections will be considered each section being equal to a quarter of the length of the operating wave at the midband frequency. The number $n$ will be considered even in accordance with the invention. Usually two sections ($n=2$) are sufficient.

If R is the impedance ratio to be changed and if $Z_{01}, Z_{02} \ldots Z_{0n}$ are the surge impedances of the quarter wave lines and $Z_{00}$ the surge impedance of the main line, we make:

$$\frac{Z_{01}}{Z_{00}}=R^{\left(\frac{1}{2n}\right)}\frac{Z_{02}}{Z_{00}}=R^{\left(\frac{3}{2n}\right)}\frac{Z_{0k}}{Z_{00}}=R^{\left(\frac{2k-1}{2n}\right)}$$

where $k$ is the ordinal number of a particular section. When $$n=2,\ \frac{Z_{01}}{Z_{00}}=R^{1/4} \text{ and } \frac{Z_{02}}{Z_{00}}=R^{3/4}$$

In the discussion to follow it will be assumed that $n=2$ for simplicity.

At the mid-band frequency, where the length of each section is exactly $\lambda/4$, the section $Z_{02}$ changes the impedance from $RZ_{00}$ to $$\sqrt{R}Z_{00}$$

and the section $Z_{01}$, from $$\sqrt{R}Z_{00}$$

to $Z_{00}$.

Let $\rho$=the ratio of increase in frequency to the mid-band frequency i. e.

$$\rho=\frac{\Delta f}{f_0}$$

where $\Delta f$=change in frequency and $f_0$=mid-band frequency.

Let $$\theta=\text{line angle}=\frac{2\pi l}{\lambda}=\frac{2\pi fl}{c}$$

where $l$=line length, $\lambda$=wave length, $f$=frequency and $c$=velocity of light.

Then $$\theta=\frac{\pi}{2}+\rho\frac{\pi}{2}$$

radians.

Let $\underset{\cdot}{K}=(K)\exp(j\phi)$=coefficient of reflection on a line section where $(K)$ is the magnitude, $\phi$ the phase angle and $\exp(j\phi)=\epsilon^{j\phi}$ $\underset{\cdot}{K}$ is defined by the relation $$\underset{\cdot}{K}=\frac{Z_L-Z_0}{Z_L+Z_0}$$

where $Z_L$ is the load impedance and $Z_0$ the surge impedance of the transmission line.

From fundamental relations the input impedance $Z_i$ of any line section is $$Z_i=Z_0\frac{1+\underset{\cdot}{K}\exp(-j2\theta)}{1-\underset{\cdot}{K}\exp(-j2\theta)}=\frac{1+(K)\exp[j(\phi-2\theta)]}{1-(K)\exp[j(\phi-2\theta)]}$$

For matching section $M_2$ with $Z_{02}=R^{3/4}Z_{00}$ and load $RZ_{00}$ $$\underset{\cdot}{K}_2=\frac{RZ_{00}-R^{\frac{1}{4}}Z_{00}}{RZ_{00}+R^{\frac{1}{4}}Z_{00}}=\frac{R^{\frac{1}{4}}-1}{R^{\frac{1}{4}}+1}\exp(j0)$$

and the input impedance $Z_{i2}$ of section $M_2$ becomes $$Z_{i2}=Z_{02}\frac{1+(K_2)\exp[-j(\pi-\rho\pi)]}{1-(K_1)\exp[-j(\pi-\rho\pi)]}$$

When $\rho\pi$ is not great so that $\cos\rho\pi\approx 1$ and $\sin\rho\pi\approx\rho\pi$ and $\rho\pi\ll 1$ the above becomes $$Z_{i2}=Z_{02}\frac{1-(K_2)+(K_2)(j\rho\pi)}{1+(K_2)-(K_2)(j\pi\rho)}\approx$$

$$Z_{02}\frac{1-(K)}{1+(K)}\exp\left[j\left(\tan^{-1}\frac{\rho(K)\pi}{1-(K)}+\tan^{-1}\frac{\rho(K)\pi}{1+(K)}\right)\right]\approx$$

$$Z_{02}\frac{1-(K_2)}{1+(K_2)}\exp\left[j\frac{2\pi(K)}{1-(K)^2}\right]=$$

$$Z_{00}R^{\frac{1}{4}}\exp\left[j\left(\frac{\pi R^{\frac{1}{4}}-1}{2\ R^{\frac{1}{4}}}\rho\right)\right]$$

This impedance constitutes the load for the section $M_1$ having a surge impedance $Z_{01}$. $\underset{\cdot}{K}_1$ for this section is given by:

$$\underset{\cdot}{K}_1\frac{Z_{00}R^{\frac{1}{4}}\exp\left[j\frac{\pi}{2}\frac{R^{\frac{1}{4}}-1}{R^{\frac{1}{4}}}\rho\right]-Z_{01}}{Z_{00}R^{\frac{1}{4}}\exp\left[j\frac{\pi}{2}\frac{R^{\frac{1}{4}}-1}{R^{\frac{1}{4}}}\rho\right]+Z_{01}}\approx$$

$$\frac{R^{\frac{1}{4}}-1+j\left[\frac{\pi}{2}\frac{R^{\frac{1}{4}}-1}{R^{\frac{1}{4}}}\rho\right]}{R^{\frac{1}{4}}+1+j\left[\frac{\pi}{2}\frac{R^{\frac{1}{4}}-1}{R^{\frac{1}{4}}}\rho\right]}\approx\frac{R^{\frac{1}{4}}-1}{R^{\frac{1}{4}}+1}\exp(j\rho\pi)$$

The input impedance $Z_{i1}$ of section $M_1$ looking from the transmission line TL then becomes:

$$Z_{i1}=Z_{01}\frac{1+\underset{\cdot}{K}_1\exp[-j(\pi-\rho\pi)]}{1-\underset{\cdot}{K}_1\exp[-j(\pi-\rho\pi)]}=$$

$$Z_{00}R^{\frac{1}{4}}\frac{1-\frac{R^{\frac{1}{4}}-1}{R^{\frac{1}{4}}+1}\exp(j\pi-j\pi)}{1+\frac{R^{\frac{1}{4}}-1}{R^{\frac{1}{4}}+1}\exp(j\pi-j\pi)}$$

$=Z_{00}\exp(j0)$ which indicates a perfect match with the approximations made. In any case the phase angle introduced into the input impedance of one line section is almost perfectly cancelled by an opposite phase shift due to the action of the other section when working off the mid-band frequency. There is, however, a small decrease in the final input resistance.

A specific case will now be dealt with using the values given in the drawing. Assume a load of 16 times the surge impedance of a main line to be matched thereto. If the matching is done in one step a quarter wave line is used as shown in Figure 1 with a surge impedance equal to $4Z_{00}$ where $Z_{00}$ is the surge impedance of the main line. If the frequency is 5 percent high the input impedance becomes $$Z_{00}(1.05)\underline{/16.33^\circ}=Z_{00}(1.006+j0.296)$$

Thus it will be seen that there is introduced a reactive component equal to about 30% of the resistive component. This causes a reflection on the main line of about 15 percent, which is three times the allowable limit of 5% in television practice.

Now suppose the transformation is done in two steps in accordance with the invention and as shown in Figure 2. In this case $Z_{01}=(16)^{1/4}Z_{00}=2Z_{00}$ and $Z_{02}=(16)^{3/4}Z_{00}=8Z_{00}$. Calculation, without the approximations previously made, shows the final input impedance at a frequency 5 percent high to be $Z_{00}\times 0.978\underline{/0.08^\circ}$. The reactive component is negligible. The slight miss-match in the resistive component produces a reflection of 1.1% on the main line, and its effect is practically negligible.

While I have shown and particularly described several embodiments of my invention, it is to be distinctly understood that my invention is not limited thereto but that modifications within the scope of my invention may be made.

I claim:

1. In combination, a wide band antenna system and a transmission line connected thereto, the impedance of said antenna being R times the surge impedance $Z_{00}$ of said line, an even number $n$ of matching line sections connected in series and interposed between said antenna and transmission line, each of said sections having a length equal to one-quarter of the length of the operating wave at midband frequency and having surge impedances of $Z_{01}, Z_{02}\ldots Z_{0n}$, the ratio of the surge impedance of each of said sections to that of the line being expressed by the relation $$\frac{Z_{0k}}{Z_{00}}=R^{\left(\frac{2k-1}{2n}\right)}$$

where $k$ denotes the ordinal number of the section.

2. In combination, a radio frequency load and a transmission line connected therein, the impedance of said load being R times the surge impedance $Z_{00}$ of said line, an even number $n$ of matching line sections connected in series and interposed between said radio frequency load and transmission line, each of said sections having a length equal to one-quarter of the length of the operating wave at midband frequency and having surge impedances of $Z_{01}$, $Z_{02}$ . . . $Z_{0n}$, the ratio of the surge impedance of each of said sections to that of the line being expressed by the relation $$\frac{Z_{0k}}{Z_{00}}=R^{\left(\frac{2k-1}{2n}\right)}$$

where $k$ denotes the ordinal number of the section.

3. In combination, a radio frequency load and a transmission line connected thereto, the impedance of said load being R times the surge impedance of the transmission line, a pair of matching line sections connected in series and interposed between said load and transmission line, each of said sections having a length equal to one-quarter of the length of the operating wave at midband frequency, the section adjacent said transmission line having an impedance $R^{1/4}$ times the surge impedance of said transmission line and the second section having an impedance $R^{3/4}$ times the surge impedance of said transmission line.

4. In combination with a wide band antenna system and a transmission line connected thereto, the impedance of said antenna being R times the surge impedance of the transmission line, of means for matching said transmission line to said antenna over said wide band comprising a pair of matching line sections connected in series and interposed between said antenna and transmission line, each of said sections having a length equal to one-quarter of the length of the operating wave at midband frequency, the section adjacent said transmission line having an impedance $R^{1/4}$ times the surge impedance of said transmission line and the second section having an impedance $R^{3/4}$ times the surge impedance of said transmission line.

5. In combination, a radio frequency load operable over a wide band of frequencies and a transmission line, an even number of series connected matching sections interposed between said transmission line and load, each having a length equal to one-quarter of the length of the operating wave at midband frequency, the surge impedance of each of said sections being so proportioned with respect to the ratio of said load impedance to the line impedance that at frequencies removed from midband the reactance introduced by each section is counterbalanced by an opposite reactance introduced by another of said sections, the surge impedance of each of said sections having values between the limits determined by the impedances of said load and said transmission line, the surge impedance of each section being less than one adjacent impedance and greater than the other adjacent impedance.

6. In combination with a wide band antenna and a transmission line, of means for matching said transmission line to said antenna over said wide band comprising a pair of series connected matching sections interposed between said transmission line and antenna, each having a length equal to one-quarter of the length of the operating wave at midband frequency, the surge impedance of each of said sections being so proportioned with respect to the ratio of said antenna impedance to line impedance that at frequencies removed from midband the reactance introduced by one section is counterbalanced by an equal and an opposite reactance introduced by the other of said sections, the surge impedance of each of said sections having values between the values of impedance of said antenna and the impedance of said transmission line, the surge impedance of each section being less than one adjacent impedance and greater than the other adjacent impedance.

7. In combination, a pair of radio frequency translating elements connected together, the impedance of one of said elements being R times the surge impedance $Z_{00}$ of the other of said elements, an even number $n$ of matching line sections connected in series and interposed between said elements, each of said sections having a length equal to one quarter of the length of the operating wave and having surge impedances of $Z_{01}$, $Z_{02}$ . . . $Z_{0n}$, the ratio of the surge impedances of said sections to the impedance of the line being expressed by the relationship $$\frac{Z_{0k}}{Z_{00}}=R^{\left(\frac{2k-1}{2n}\right)}$$

where $k$ denotes the ordinal number of each section.

8. In combination, a first radio frequency translating means and a second translating means connected thereto, the impedance of said first translating means being R times the surge impedance of the second translating means, a pair of matching line sections connected in series and interposed between said translating means, each of said sections having a length equal to one-quarter of the length of the operating frequency at midband frequency, the section adjacent said second translating means having an impedance $R^{1/4}$ times the surge impedance of said second translating means and the second section having an impedance $R^{3/4}$ times the surge impedance of said second translating means.

PHILIP S. CARTER.